United States Patent
Kang et al.

(10) Patent No.: US 7,937,954 B2
(45) Date of Patent: May 10, 2011

(54) COOLING AND HEATING CABINET DEVICE OF REAR SEAT FOR VEHICLES USING THERMOELECTRIC ELEMENT

(75) Inventors: Sungho Kang, Daejeon-si (KR);
Yongsang Kim, Daejeon-si (KR);
Yooncheol Park, Daejeon-si (KR);
Sangchul Byun, Daejeon-si (KR);
Yongeun Seo, Daejeon-si (KR)

(73) Assignee: Halla Climate Control Corporation, Daejeon-Si (KR)

( * ) Notice: Subject to any disclaimer, the term of this patent is extended or adjusted under 35 U.S.C. 154(b) by 603 days.

(21) Appl. No.: 12/085,877

(22) PCT Filed: Dec. 27, 2006

(86) PCT No.: PCT/KR2006/005737
§ 371 (c)(1),
(2), (4) Date: May 30, 2008

(87) PCT Pub. No.: WO2007/075034
PCT Pub. Date: Jul. 5, 2007

(65) Prior Publication Data
US 2009/0288800 A1 Nov. 26, 2009

(30) Foreign Application Priority Data

Dec. 27, 2005 (KR) .................. 10-2005-0130294
Nov. 9, 2006 (KR) .................. 10-2006-0110686
Dec. 26, 2006 (KR) .................. 10-2006-0133885

(51) Int. Cl.
*F25B 21/02* (2006.01)

(52) U.S. Cl. ................. 62/3.3; 62/3.61; 62/244

(58) Field of Classification Search ............ 62/3.3, 62/3.6, 3.61, 244, 261; 165/42, 59; 454/161, 454/167
See application file for complete search history.

(56) References Cited

U.S. PATENT DOCUMENTS

| | | | |
|---|---|---|---|
| 5,547,019 A * | 8/1996 | Iacullo | 165/51 |
| 5,646,455 A * | 7/1997 | Price | 307/10.1 |
| 6,213,198 B1* | 4/2001 | Shikata et al. | 165/202 |
| 6,344,630 B1* | 2/2002 | Jarvis et al. | 219/386 |
| 6,453,678 B1* | 9/2002 | Sundhar | 62/3.2 |
| RE38,128 E * | 6/2003 | Gallup et al. | 62/3.5 |
| 6,763,666 B2* | 7/2004 | Fong | 62/3.61 |
| RE41,295 E * | 5/2010 | Cauchy | 62/3.3 |
| 2003/0124969 A1* | 7/2003 | Currle et al. | 454/139 |
| 2004/0103679 A1* | 6/2004 | Ichishi et al. | 62/244 |
| 2005/0257531 A1* | 11/2005 | Kadle et al. | 62/3.3 |
| 2005/0268621 A1* | 12/2005 | Kadle et al. | 62/3.2 |

(Continued)

FOREIGN PATENT DOCUMENTS
DE 3825 141 A1 1/1990

(Continued)

*Primary Examiner* — Mohammad Ali
(74) *Attorney, Agent, or Firm* — Fulbright & Jaworski L.L.P

(57) ABSTRACT

The present invention relates to a cooling and heating cabinet device of a rear seat side for a vehicle using a thermoelectric module that is mounted between rear seats of a vehicle, having cooling and heating functions and further having an arm-resting function irrespective of its activation as the cooling and heating device, and that makes the exhaust fan activated by the control of the controller of the air conditioning system, thereby achieving the air-refreshing function as well as the cooling or heating mode function of the cooling and heating cabinet.

15 Claims, 13 Drawing Sheets

U.S. PATENT DOCUMENTS

2006/0138812 A1 * 6/2006 Aoki .................. 297/180.14

FOREIGN PATENT DOCUMENTS

| DE | 89 12 320 U1 | 1/1991 |
|---|---|---|
| DE | 296 05 954 U1 | 7/1996 |
| DE | 198 11 185 C1 | 7/1999 |
| DE | 299 22 694 U1 | 2/2000 |
| DE | 101 01 028 C2 | 7/2002 |
| DE | 203 08 399 U1 | 10/2003 |
| DE | 103 48 263 | 5/2005 |
| JP | 55-100970 U | 7/1980 |
| JP | 55-124338 U | 9/1980 |
| KR | 10-0164175 B1 | 9/1998 |
| KR | 20-0131117 Y1 | 9/1998 |
| KR | 10-2001-0054133 A | 7/2001 |
| KR | 10-2005-0003559 A | 1/2005 |
| WO | WO 2004/106109 A1 | 12/2004 |

* cited by examiner

COOLING AND HEATING CABINET DEVICE OF REAR SEAT FOR VEHICLES USING THERMOELECTRIC ELEMENT

This application is a §371 of PCT/KR2006/005737 filed Dec. 27, 2006, which claims priority from Korean Patent Application No. 10-2005-0130294 filed Dec. 27, 2005, Korean Patent Application No. 10-2006-0110686 filed Nov. 9, 2006 and Korean Patent Application No. 10-2006-0133885 filed Dec. 26, 2006.

TECHNICAL FIELD

The present invention relates to a cooling and heating cabinet device of a rear seat side for a vehicle using a thermoelectric module, and more particularly, to a cooling and heating cabinet device of a rear seat side for a vehicle using a thermoelectric module that is mounted between rear seats of a vehicle to have cooling and heating functions, and further, has an arm-resting function irrespective of its activation as the cooling and heating device.

BACKGROUND ART

In these days, as vehicles like automobiles and recreational vehicles are increasingly popularized, they become a necessity in the modern society, and thus, they are designed wherein a variety of facilities are provided to make passengers feel comfortable as if they are home.

Therefore, such the facilities are recently considered as an important factor in determining the kinds of vehicles.

One of various kinds of facilities is, for example, a cool-box that is adapted to cool the articles stored therein.

The cool-box is a very small-sized refrigerator that is mounted in the interior of a vehicle, while having the same operational principles, shape, and function as the existing refrigerators as appliances.

Since the conventional cool-box has the same system as the existing general refrigerators, it includes a power supply device, a compressor, a fan, and a driving device like a motor for activating them, such that the structure becomes complicated and the degree of space utility is low at the restricted inside of the vehicle.

That is to say, the conventional cool-box can be mounted, as shown in FIG. 13, in a glove box G in front of an assistant' seat, in a console box C positioned between the front seats, or in an arm-rest A positioned between the rear seats.

However, the glove box G in front of the assistant' seat and the console box C between the front seats are designed to contain articles (e.g., maps, a registration card, and so on) and safety devices necessary for driving therein, and thus, if the cool-box is additionally provided therein, the glove box G and the console box C should have the internal space enlarged more than before.

On the other hand, the cool-box is just a facility for providing many conveniences in use in the vehicle, irrespective of the vehicle' driving, and therefore, to assist the safe driving of the vehicle, it is desirably mounted in the arm-rest A positioned between the rear seats. One example is disclosed in Korean Utility Model Laid-Open-Publication No. 1998-39565 wherein the arm-rest has an icebox contained therein.

Referring to FIG. 14, an explanation on the prior art will be given below.

As shown, an air supply duct 40 is connected to a blast pipe P of an air conditioning system S in such a manner as to receive air that is passed through a blower motor B and an evaporator A of the air conditioning system S. The air supply duct 40 is provided with an adjusting valve 41 for adjusting the supply of air.

Further, the adjusting valve 41 is connected to a switch 42 for opening/closing it. And, the air supply duct 40 is connected at the end portion thereof to injection holes 43.

The injection holes 43 are formed at the inside of the arm-rest of a cabinet shape with a cover mounted on.

According to the conventional structure, the air conditioner of the vehicle is activated to discharge cool air through the injection holes, such that the drink bottles stored in the arm-rest of the cabinet shape can be kept cooled.

However, in a summer season during the weather is not relatively hot, the vehicle is driven with no activation of the air conditioner, and in this case, the indoor temperature of the vehicle may be raised even though the outdoor temperature is not relatively high, such that the articles in the arm-rest cabinet may be easily warm, thereby making it uncomfortable to drink them.

To the contrary, so as to make the articles in the arm-rest cabinet changed to a low temperature good for drinking, the air conditioner should be activated again, and in this case, fuel consumption may undesirably occur.

Moreover, under the conventional structure, the air conditioner has to be activated all the time for the purpose of maintaining the articles stored in the arm-rest cabinet at a low temperature irrespective of the indoor cooling in summer, thereby undesirably causing a large quantity of fuel consumption.

DISCLOSURE OF INVENTION

Technical Problem

On the other hand, the conventional structure has a function of keeping the articles therein at a low temperature, but does not provide any function of heating them.

To solve the above-mentioned problems, accordingly, it is an object of the present invention to provide a cooling and heating cabinet device of a rear seat side for a vehicle using a thermoelectric module that is mounted between rear seats of a vehicle to have cooling and heating functions, and further, has an arm-resting function irrespective of its activation as the cooling and heating device.

Technical Solution

To achieve the above object, according to the present invention, there is provided a cooling and heating cabinet device of a rear seat side for a vehicle using a thermoelectric module, including: a cooling and heating cabinet disposed at the upper surface of the middle portion of a floor panel supporting seat portions of rear seats of the vehicle and having a storage room opened at one side thereof; a cover for opening and closing an opened portion of the cooling and heating cabinet; a duct having an introduction duct and a discharge duct, the introduction duct being directed to the inside of the vehicle and the discharge duct fluidically communicating with a trunk room through a partition of a vehicle body defining the interior of the vehicle and the trunk room in such a manner as to discharge the indoor air flowing in through the introduction duct therethrough, the introduction duct and the discharge duct of the duct having one side of the cooling and heating cabinet contacted therebetween; the thermoelectric module disposed below the cooling and heating cabinet such that according to the direction of current flows, when one side portion thereof absorbs the heat generated in the storage room, the other side portion thereof emits the heat to the duct, and when one side portion emits heat to the storage room, the other side portion absorbs the heat generated in the duct; and an exhaust fan disposed in the duct for introducing the indoor air through the introduction duct and for discharging the absorbed air to the discharge duct.

BEST MODE FOR CARRYING OUT THE INVENTION

Figure 1:
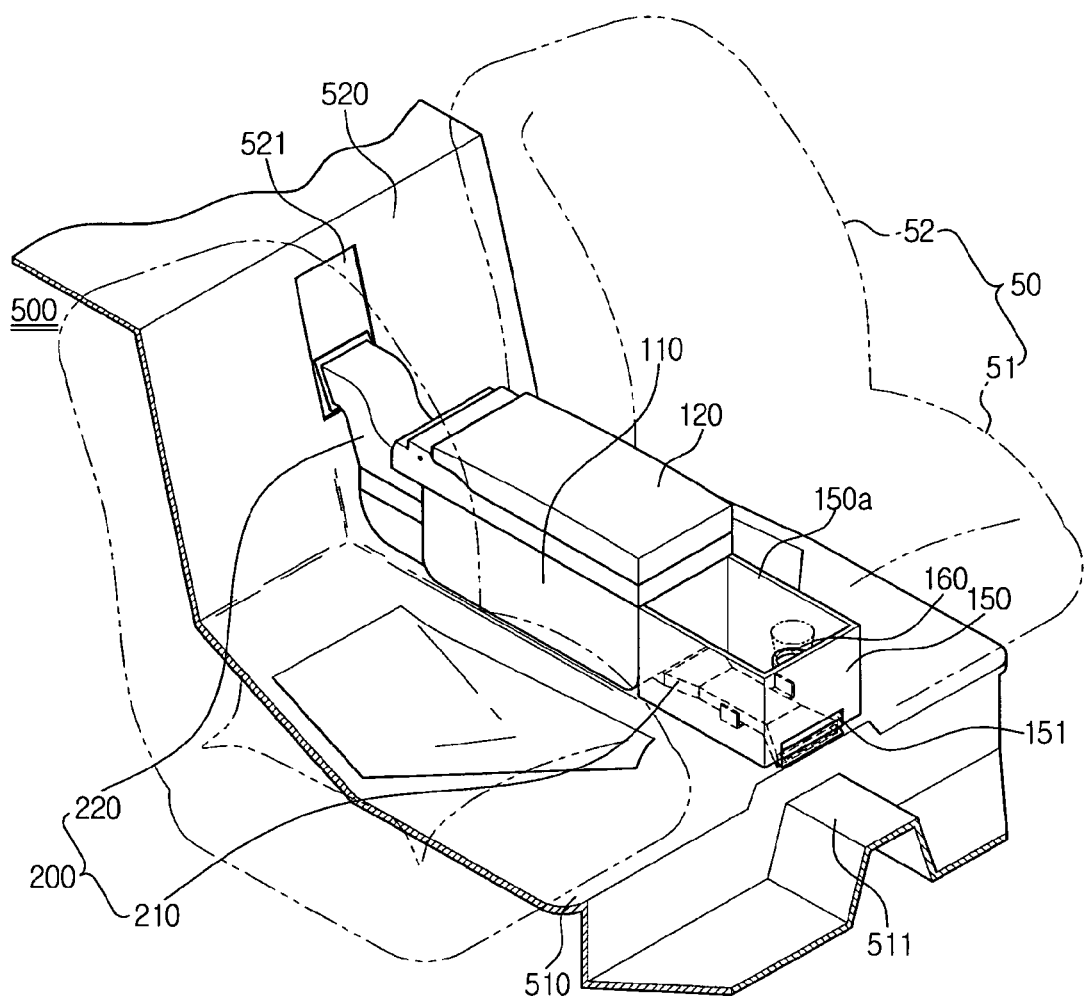
FIG. 1 is a perspective view showing a cooling and heating cabinet device of a rear seat side for a vehicle using a thermoelectric module according to the present invention, wherein the cooling and heating cabinet device, as one example, is mounted at the inside of the vehicle.

Hereinafter, an explanation of a cooling and heating cabinet device of a rear seat side for a vehicle using a thermoelectric module according to the present invention will be given with reference to the attached drawings.

The cooling and heating cabinet device of a rear seat side for a vehicle using a thermoelectric module includes a cooling and heating cabinet 110, a cover 120, a duct 200, a thermoelectric module 310, and an exhaust fan 400.

The cooling and heating cabinet 110 is disposed at the upper surface of the middle portion of a floor panel 510 supporting seat portions 51 of rear seats 50 and has a storage room 110a opened at one side thereof.

The cover 120 is rotatably mounted by means of a hinge means 121 for opening and closing an opened portion 110b of the cooling and heating cabinet 110.

The duct 200 has an introduction duct 210 and a discharge duct 220.

The introduction duct 210 is directed to the inside of the vehicle, and the discharge duct 220 fluidically communicates with a trunk room 500 through a partition 520 of a vehicle body defining the interior of the vehicle and the trunk room 500 and supporting back portions 52 of the rear seats 50.

And, the cooling and heating cabinet 110 is formed in such a manner as to come into contact between the introduction duct 210 and the discharge duct 220 at one side thereof, such that the indoor air flowing in through the introduction duct 210 is discharged to the discharge duct 220.

The thermoelectric module 310 is disposed below the cooling and heating cabinet 110 such that according to the direction of current flows, when one side portion 310a thereof absorbs the heat generated in the storage room 110a, the other side portion 310b thereof emits the heat to the duct 200, and when one side portion 310a emits heat to the storage room 110a, the other side portion 310b absorbs the heat generated in the duct 200.

Figure 10:
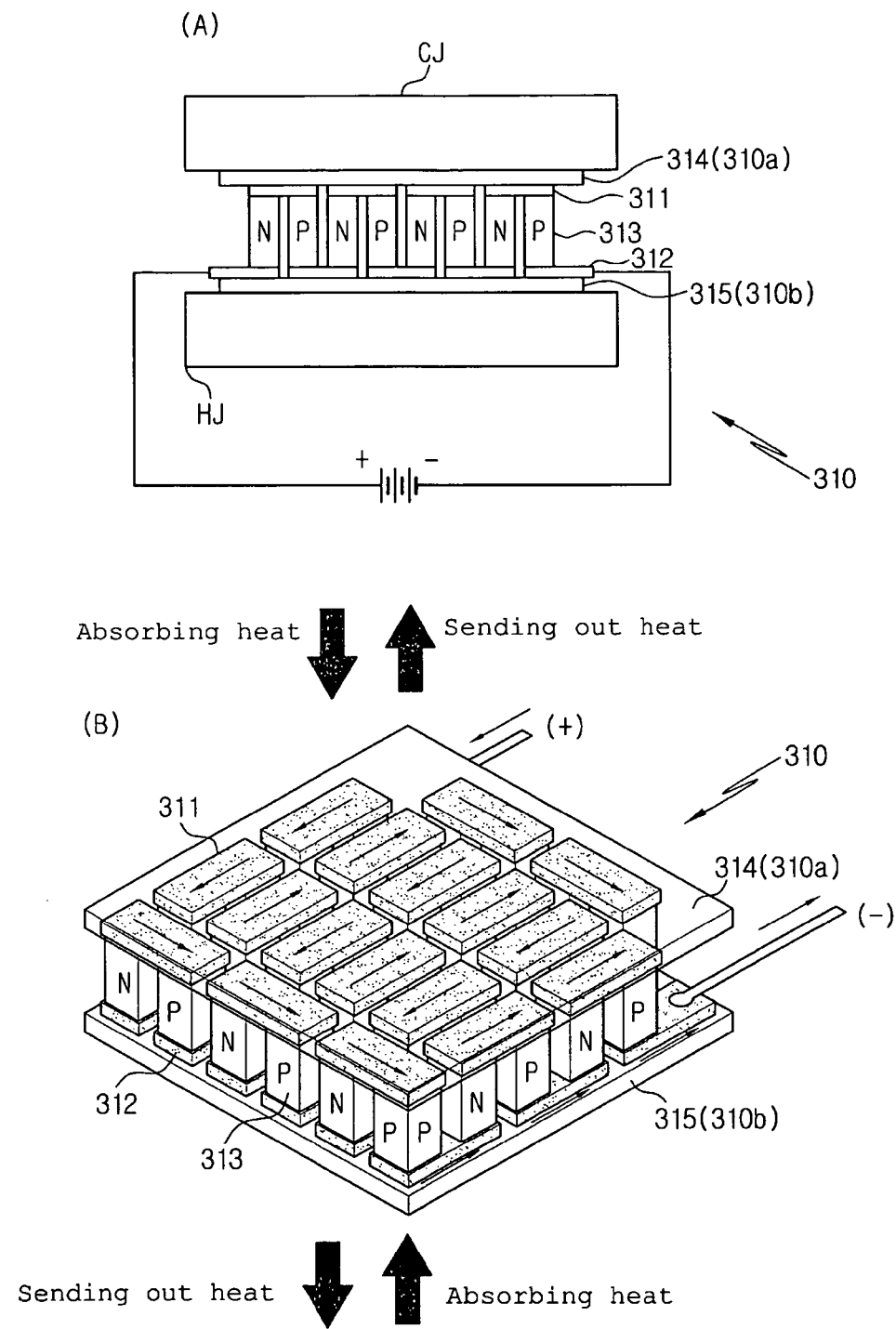
FIGS. 10a and 10b are views showing the structures of the thermoelectric modules applied to the cooling and heating cabinet devices according to the first and second embodiments of the present invention.

In the thermoelectric module 310, as shown in FIGS. 10a and 10b, according to the direction of the current flows, the heat-emitting operation is carried out at one side portion 310a and the heat-absorbing operation at the other side portion 310b, and otherwise, the heat-absorbing operation is carried out at one side portion 310a and the heat-emitting operation at the other side portion 310b.

The thermoelectric module 310 has a variety of configurations, and for example, as shown in FIGS. 10a and 10b, a plurality of semiconductor thermoelectric elements 313 that including a plurality of N-type semiconductor elements and a plurality of P-type semiconductor elements are arranged in turn in such a manner as to be connected in turn with upper metal electrodes 311 and lower metal electrodes 312 on the upper and lower surfaces thereof.

And, the plurality of semiconductor thermoelectric elements 313 are electrically connected in serial relation to one another. Moreover, the connection of the upper and lower metal electrodes 311 and 312 with the semiconductor thermoelectric elements 313 is carried out by means of soldering.

And, the upper and lower metal electrodes 311 and 312 are connected on upper and lower ceramic substrates 314 and 314 in such a manner as to be fixed together with the whole assembly body. Further, direct current power is electrically connected to the lower metal electrodes 312 on the semiconductor thermoelectric elements 313.

Thereby, when the current is applied from the N-type semiconductor elements to the P-type semiconductor elements, according to Peltier effect, heat is absorbed from the upper portion to the lower portion and is emitted through the lower portion.

In this case, the upper ceramic substrate 314 is one side portion 319a as mentioned above, and the lower ceramic substrate 315 is the other side portions 310b as mentioned above.

In other words, as shown in FIG. 10A, the upper portion of the N and P-type semiconductor thermoelectric elements 313 serves as an absorbing and cooling joint CJ, and the lower portion of the P and N-type semiconductor thermoelectric elements 313 serves as an emitting and heating joint HJ. In this case, if the polarity of power is changed, the direction where the heat is absorbed and emitted can be varied.

On the other hand, the exhaust fan 400 is disposed in the duct 200 for introducing the indoor air through the introduction duct 210 and for discharging the absorbed air to the discharge duct 220.

Under the above configuration, the cooling and heating cabinet device 110 of the present invention can have an arm-resting function such that passengers sitting on the rear seats can conveniently place their arm thereon.

The cooling and heating cabinet device 100 of the present invention can be used as a cooling device or a heating device in accordance with the direction of power current applied to the thermoelectric module 310.

In more detail, in summer season, the cooling and heating cabinet device 110 is usually used as a cooling device. That is to say, so as to absorb the heat in the storage room 110*a* at one side portion 310*a* of the thermoelectric module 310 and to emit the heat to the duct 200 at the other side portion 310*a* thereof, the direction of power current applied to the thermoelectric module 310 is changed, and then, the exhaust fan 400 is operated.

Thereby, as the heat in the air in the storage room 110*a* of the cooling and heating cabinet device 110 is absorbed, the storage room 110*a* becomes more and more at a low temperature and finally serves as the cooling device, such that the articles P like drink bottles stored in the storage room 110*a* always can be kept at the low temperature.

At this time, as the exhaust fan 400 is being operated, the indoor air of the vehicle flows in through the introduction duct 210 by the forced absorption of the exhaust fan 400 and is heat-exchanged with the other side portion 310*a* of the thermoelectric module 310. After that, the air is discharged through the discharge duct 220 to the trunk room 500.

In this case, since the temperature of the indoor air is lower than that emitted from the other side portion 310*b* of the thermoelectric module 310, the indoor air that is passed through the duct 200 is heat-exchanged with the heat emitted from the other side portion 310*b* of the thermoelectric module 300.

Therefore, the heat-emitting is carried out more actively at the other side portion 310*b* of the thermoelectric module 300, and the heat-absorbing is also improved at one side portion 310*a* of the thermoelectric module 300, such that the storage room 110*a* always can be kept at a low temperature.

As a result, if the cooling and heating cabinet device of the present invention is used as a cooling device in summer season, the operational performances the thermoelectric module 300 has can be exerted to the maximum.

In this case, as discussed above the exhaust fan 400 is operated in summer season, but the cooling can be obtained just by the thermoelectric module 300, without the operation of the exhaust fan 400. However, if the exhaust fan 400 is operated, the cooling function of the thermoelectric module 300 can be more improved.

At this time, if the exhaust fan 400 is operated, the refreshing effect of the indoor air can be additionally obtained.

On the other hand, in winter season, the cooling and heating cabinet device 110 is usually used as a heating device. That is to say, so as to emit the heat at one side portion 310*a* of the thermoelectric module 310 and to absorb the heat at the other side portion 310*a* thereof, the direction of power current applied to the thermoelectric module 310 is changed, and then, the exhaust fan 400 is operated.

Thereby, the heat in the air in the storage room 110*a* of the cooling and heating cabinet device 110 is emitted at one side portion 310*a* of the thermoelectric module 310, the storage room 110*a* becomes more and more at a high temperature and finally serves as the heating device, such that the articles P like drink bottles stored in the storage room 110*a* always can be kept at the high temperature.

At this time, as the exhaust fan 400 is being operated, the indoor air of the vehicle flows in through the introduction duct 210 by the forced absorption of the exhaust fan 400 and is heat-exchanged with the other side portion 310*a* of the thermoelectric module 310. After that, the air is discharged through the discharge duct 220 to the trunk room 500.

In this case, since the temperature of the indoor air is lower than that emitted from the other side portion 310*b* of the thermoelectric module 310, the indoor air that is passed through the duct 200 is heat-exchanged with the heat emitted from the other side portion 310*b* of the thermoelectric module 300.

Therefore, the heat-absorbing is carried out more actively at the other side portion 310*b* of the thermoelectric module 300, and the heat-heating is also improved at one side portion 310*a* of the thermoelectric module 300, such that the storage room 110*a* always can be kept at a high temperature.

As a result, if the cooling and heating cabinet device of the present invention is used as a heating device in winter season, the operational performances the thermoelectric module 300 has can be exerted to the maximum.

In this case, as discussed above the exhaust fan 400 is operated in winter season, but the heating can be obtained just by the thermoelectric module 300, without the operation of the exhaust fan 400. However, if the exhaust fan 400 is operated, the heating function of the thermoelectric module 300 can be more improved.

At this time, if the exhaust fan 400 is operated, the refreshing effect of the indoor air can be additionally obtained.

The cooling and heating cabinet device according to the present invention is mounted in the middle portion between the rear seats to achieve the cooling and heating functions, while having the arm-resting function irrespective of the cooling and heating operations.

Further, the cooling and heating cabinet device of the present invention makes the storage room 110*a* of the cooling and heating cabinet 110 serving as a cooling or heating device by using the introduction of the indoor air as well as the thermoelectric module 310, and therefore, the activation of the air conditioner is not always needed to obtain the cooling function.

On the other hand, if the cooling and heating cabinet device of the present invention makes the storage room 110*a* serving as the heating device in winter season, the heating performance can be improved even while the heater basically provided in the vehicle is activated.

In other words, in the process of introducing the indoor air if the heater basically provided in the vehicle is activated, the temperature of the indoor air is high. As the air at the high temperature is supplied through the introduction duct 210 of the duct 200, it is absorbed at the other side portion 310*b* of the thermoelectric module 310, such that the heat-emitting performance at one side portion 310*a* of the thermoelectric module 310 is more improved to allow the storage room 110*a* to be always kept at a high temperature.

Therefore, the case where the indoor air is used while the heater is being activated permits the heat-emitting performance at one side portion 310*a* of the thermoelectric module 310 to be more improved when compared with the case where the indoor air is used while the heater is not being activated, such that the storage room 110*a* can be always kept at a high temperature.

On the other hand, if the cooling and heating cabinet device of the present invention makes the storage room 110*a* serving as the cooling device in summer season, the cooling performance can be improved even while the air conditioner basically provided in the vehicle is activated.

In other words, in the process of introducing the indoor air if the air conditioner basically provided in the vehicle is activated, the temperature of the indoor air is low. As the air at the low temperature is supplied through the introduction duct 210 of the duct 200, it is heat-exchanged with the heat emitted at the other side portion 310*b* of the thermoelectric module 310, such that the heat-absorbing performance at one side portion 310*a* of the thermoelectric module 310 is more improved to allow the storage room 110*a* to be always kept at a low temperature.

Therefore, the case where the indoor air is used while the air conditioner is being activated permits the heat-absorbing performance at one side portion 310*a* of the thermoelectric module 310 to be more improved when compared with the case where the indoor air is used while the air conditioner is not being activated, such that the storage room 110*a* can be always kept at a low temperature.

On the other hand, according to the cooling and heating cabinet device of the present invention, even when the power is not applied to the thermoelectric module 310 of the cooling and heating cabinet 110, when the indoor air should be ventilated, the exhaust fan 400 is activated such that the indoor air is absorbed through the introduction duct 210 and is discharged through the discharge duct 220 to the trunk room 500 side. At this time, the exhaust fan 400 is controlled by means of a controller of an air conditioning system basically provided in the vehicle.

However, even when the thermoelectric module 310 is operated, the exhaust fan 400 is activated by the control of the controller of the air conditioning system, thereby achieving the air-refreshing function as well as the cooling or heating mode function of the cooling and heating cabinet 110.

Further, the exhaust fan 400 may be activated or not during the operation of the thermoelectric module 310. That is to say, if the exhaust fan 400 is activated during the operation of the thermoelectric module 310, the cooling or heating function can be more improved when compared with the case where the exhaust fan 400 is not activated, and the air-refreshing function is also obtained.

Also, even when the thermoelectric module 310 is not activated, the exhaust fan 400 can be activated when the indoor air should be ventilated.

MODE FOR THE INVENTION

First Embodiment

An explanation of a cooling and heating cabinet device of a rear seat side for a vehicle using a thermoelectric module according to the first embodiment of the present invention will be given with reference to FIGS. 1 to 3 and 12.

The cooling and heating cabinet device according to the first embodiment of the present invention includes the cooling and heating cabinet 110, the cover 120, the duct 200, the thermoelectric module 310, and the exhaust fan 400.

The cooling and heating cabinet 110 is disposed at the upper surface of the middle portion of the floor panel 510 supporting the seat portions 51 of the rear seats 50 and has the storage room 110*a* opened at one side thereof.

Therefore, the rear seat 50 is disposed on the both sides of the cooling and heating cabinet 110. And, the cooling and heating cabinet 110 has such a size as to have the seat portion 51 of each rear seat 50 mounted positioned to the middle height thereof, such that the passengers after sitting on the seat portions 51 can place their arm on the cooling and heating cabinet 110.

In this case, the opened portion 110*b* of the storage room 110*a* is desirably opened toward the upper side of the cooling and heating cabinet 110.

The cover 120 serves to open and close the opened portion 110*b* of the cooling and heating cabinet 110 and also to place the passenger arm thereon, thereby providing the arm-resting function to him or her.

On the other hand, a keeping room-cover 130 is detachably mounted on the opened portion 110*b*, the keeping room-cover 130 having a keeping room 131 formed therein for containing articles that do not need to be cooled and heated therein.

That is to say, after the keeping room-cover 130 is mounted on the opened portion 110*b* if the cover 120 is closed, the keeping room 131 is formed by the indented space of the top surface of the cover 120 and by the indented space of the keeping room-cover 130.

As noted above, the cooling and heating cabinet 110 of the present invention has some advantages in having an arm-resting function, a cooling and heating function, and a function of keeping general articles therein.

In the case where the keeping room-cover 130 is provided, it is detachable from the opened portion 110*b* when articles are put or drawn in/from the storage room 110*a*.

On the other hand, the duct 200 includes the introduction duct 210 and the discharge duct 220. The introduction duct 210 is directed to the inside of the vehicle, and the discharge duct 220 fluidically communicates with a trunk room 500 through a partition 520 of a vehicle body that defines the interior of the vehicle and the trunk room 500 and supports the back portions 52 of the rear seats 50.

And, the introduction duct 210 is formed partially in such a manner as to come into contact with one side surface of the cooling and heating cabinet 110 except the top surface thereof, such that the indoor air flowing in through the introduction duct 210 is discharged through the discharge duct 220.

In the first embodiment of the present invention, the introduction duct 210 is positioned between the lower surface of the cooling and heating cabinet 110 and the floor panel 510, but may be positioned in such a manner as to come into contact with any one of the left and right sides of the cooling and heating cabinet 110.

According to the present invention, therefore, the introduction duct 210 constituting the duct 200 is positioned between the lower surface of the cooling and heating cabinet 110 and the floor panel 510, which makes the outer appearance more compacted when compared with that formed on the left or right side of the cooling and heating cabinet 110.

The thermoelectric module 310 is disposed below the cooling and heating cabinet 110 such that according to the direction of current flows, when one side portion 310*a* thereof absorbs the heat generated in the storage room 110*a*, the other side portion 310*b* thereof emits the heat to the duct 200, and when one side portion 310*a* emits heat to the storage room 110*a*, the other side portion 310*b* absorbs the heat generated in the duct 200.

In the first embodiment of the present invention, at least one or more thermoelectric modules 310 are mounted between the cooling and heating cabinet 110 and the duct 200 such that one side portions 310*a* of the thermoelectric modules 310 abut with the lower surface of the cooling and heating cabinet 110 and the other side portions 310*b* thereof abut with the upper surface of the duct 200. And, the other side portion 310*b* of each of the thermoelectric modules 310 is disposed on a heat-exchange member 410 so as to heat-exchange with the indoor air flowing in through the duct 200.

Therefore, the heat-exchanging member 410 is separately disposed for heat-exchanging with the air in the duct 200, thereby improving the heat-exchanging performance, which allows the performances the thermoelectric module 310 has to be utilized to the maximum and improves the cooling or heating function of the storage room 110a of the cooling and heating cabinet 110.

Further, in the first embodiment of the present invention, a heat-transmitting means 430 is additionally disposed between one side portion 310a of the thermoelectric module 310 and the lower surface of the cooling and heating cabinet 110.

The exhaust fan 400 is disposed in the duct 200, desirably in the discharge duct 220, for discharging the indoor air flowing in the introduction duct 210 to the discharge duct 220.

In the first embodiment of the present invention, the exhaust fan 400 is formed of an axial fan.

Figure 4:
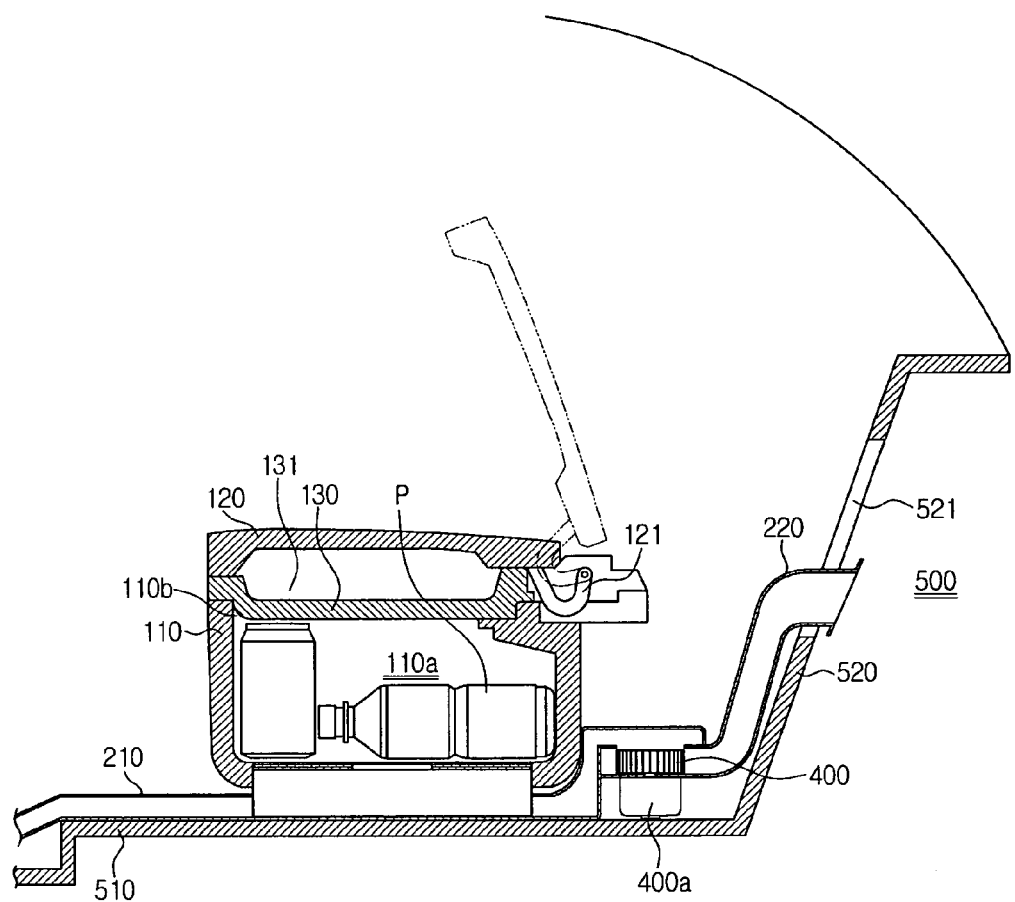
FIGS. 4 to 6 are sectional views showing various installation structures when an exhaust fan is applied as a sirocco fan in a cooling and heating cabinet device according to a first embodiment of the present invention.
Figure 5:
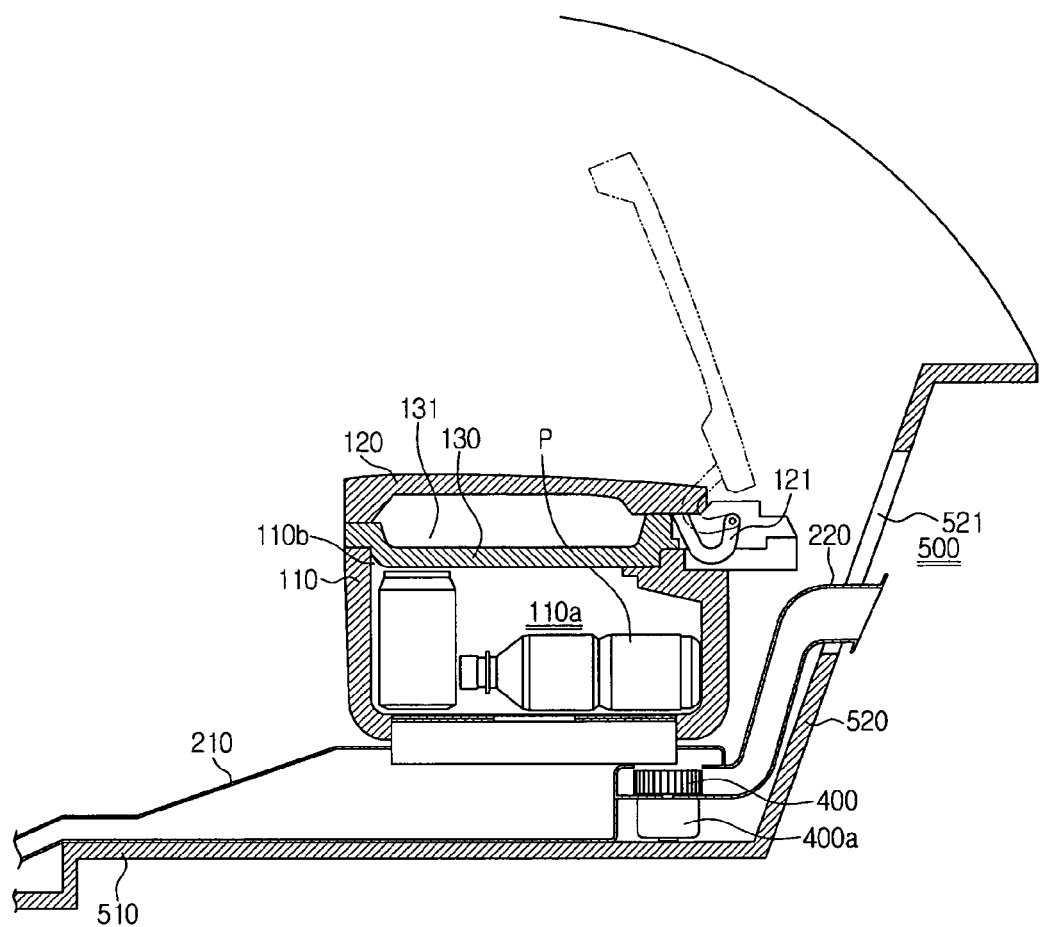
Figure 6:
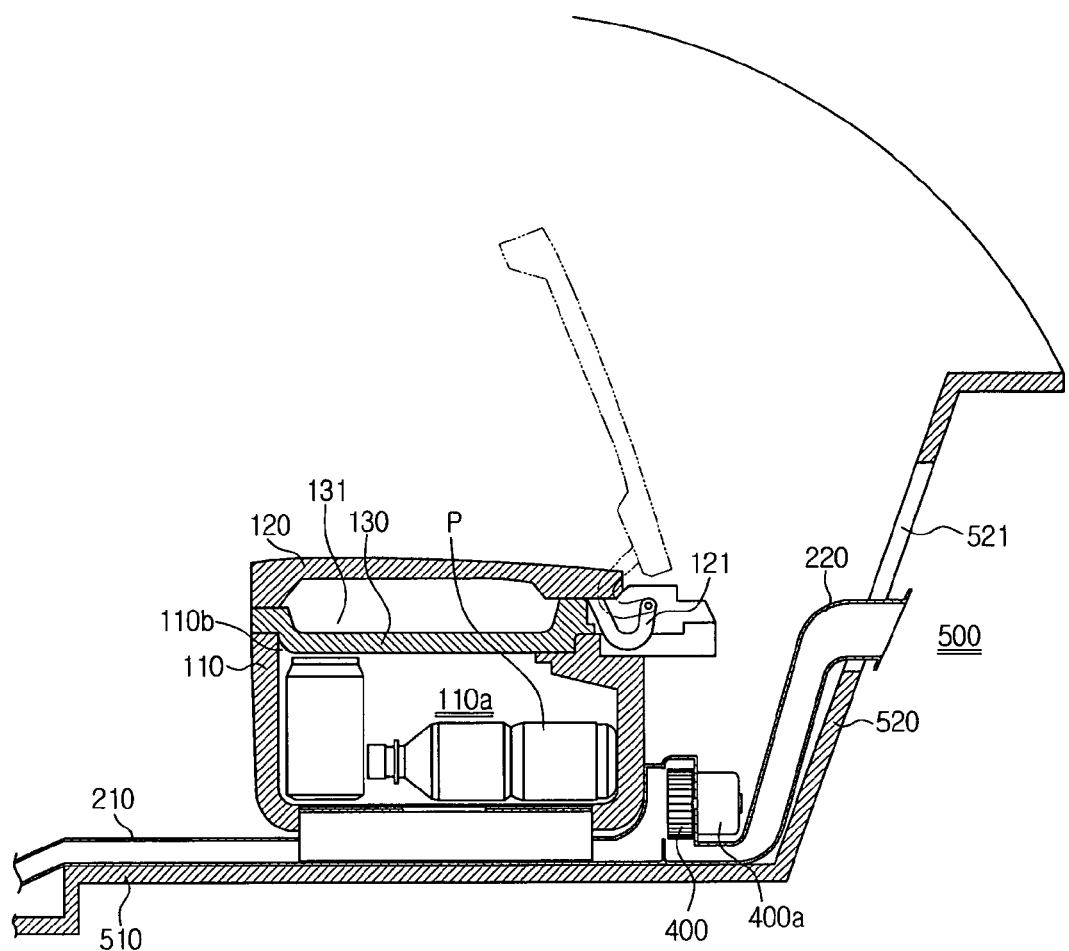

However, in the first embodiment of the present invention, the exhaust fan 400 may be formed of a sirocco fan driven by a motor 400a, desirably, by a BLDC (brushless direct current) motor, as shown in FIGS. 4 to 6.

Namely, the sirocco fan 400 is disposed in the discharge duct 220 to make noises advancing to the trunk room 500 side, while preventing noises from advancing to the inside.

The sirocco fan 400 makes the air-absorbing direction perpendicular to the airemitting direction, which is widely used in places where low noises and high air flows are needed.

As mentioned above, the sirocco fan 400 has a high performance at a relatively compact size, and therefore, it is desirably adopted in the cooling box for a vehicle using the thermoelectric module like the present invention.

The sirocco fan is activated by connecting with the BLDC motor that has a high performance at a relatively compact size and generates relatively low noises.

As described above, the sirocco fan and the BLDC motor are adopted in the cooling box for a vehicle using the thermoelectric module like the present invention, such that the noises are low and excellent performances are obtained at a high pressure.

The exhaust fan 400 as the sirocco fan, as shown in FIG. 4, is adopted for a large-sized car having a relatively long overall length at the inside thereof, with having no limits in space. On the other hand, FIGS. 5 and 6 show the variations according to the specification of the vehicle.

In the embodiment as shown in FIG. 5, the sirocco fan 400 is adopted for a vehicle having a relatively short overall length at the inside thereof. In this case, the height of the cooling and heating cabinet 110 is high, but the length of the cooling and heating cabinet 110 is short in a lengthwise direction. Therefore, the sirocco fan 400 is adopted to a small-sized car having a relatively short overall length at the inside thereof. Also, the sirocco fan 400 and the BLDC motor 400a are disposed below the cooling and heating cabinet 110, such that the discharge duct 220 can be placed low with respect to the trunk room 500, thereby reducing the generation of noises therefrom.

The cooling and heating cabinet 110 using the thermoelectric module as shown in FIG. 6 is adopted to a mid-sized car having a relatively medium overall length at the inside thereof. In this case, the sirocco fan 400 and the BLDC motor are disposed in a vertical relation to each other, the length of the cooling and heating cabinet 110 is not long in the lengthwise direction thereof and the height of the cooling and heating cabinet 110 is short, such that the arm-resting function is more effective than the variation as shown in FIG. 4.

As mentioned above, the cooling and heating cabinet 110 using the thermoelectric module according to the present invention can be adopted to all the small, mid, and large-sized vehicles by varying the shape of the duct 200 and the positions mounted of the sirocco fan 400 and the BLDC motor 400a. Therefore, the cooling and heating cabinet 110 of the present invention is made and formed integrally with the rear seat assembly in accordance with the specification of the vehicle.

On the other hand, in the first embodiment of the present invention, the storage room 110a, the introduction duct 210, and the discharge duct 220 are arranged in the lengthwise direction of the cooling and heating cabinet 110, thereby allowing the cooling and heating cabinet 110 of the present invention to be compact in the size.

Figure 12:
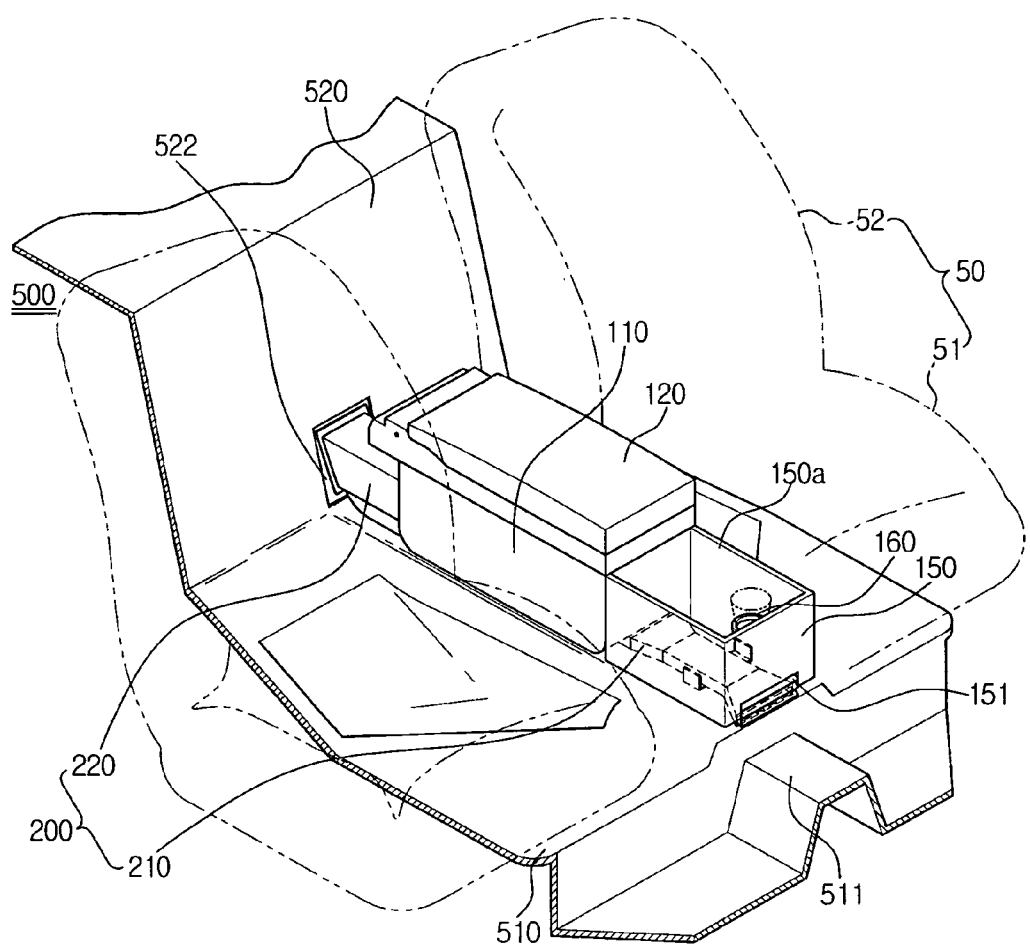
FIG. 12 is a perspective view showing a cooling and heating cabinet device of a rear seat side for a vehicle using a thermoelectric module according to the present invention, wherein the cooling and heating cabinet device, as another example, is mounted at the inside of the vehicle.
Figure 13:
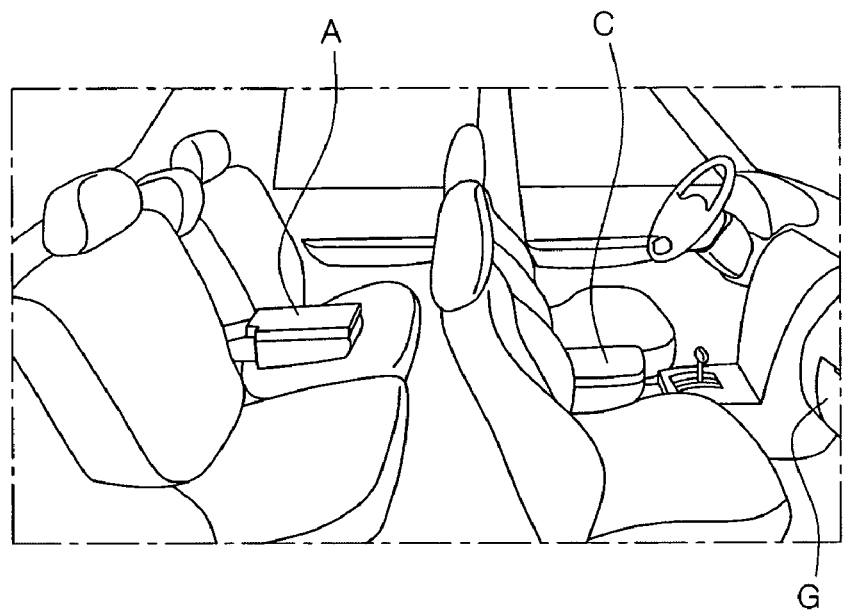
FIG. 13 is a perspective view showing the inside of general vehicles.
Figure 14:
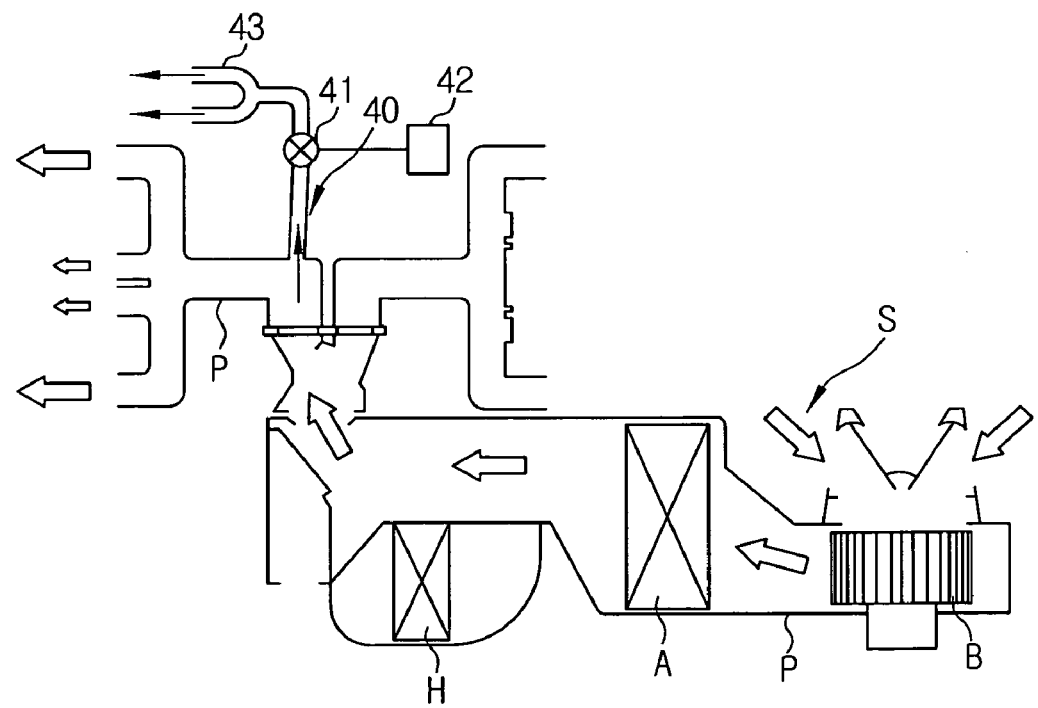
FIG. 14 is a view showing one of conventional cooling devices.

Moreover, the introduction duct 210 is, as shown in FIGS. 1 and 12, extended up to the end portion of the floor panel 510 on which the rear seat 50 is disposed, thereby effectively absorbing the air ventilated at the rear-floor side. That is to say, the introduction duct 210 is disposed on the top portion of a protruded portion 511 of the floor panel 510 formed between the passengers sitting the left and right rear seats, thereby absorbing the indoor air that is relatively less polluted.

Figure 2:
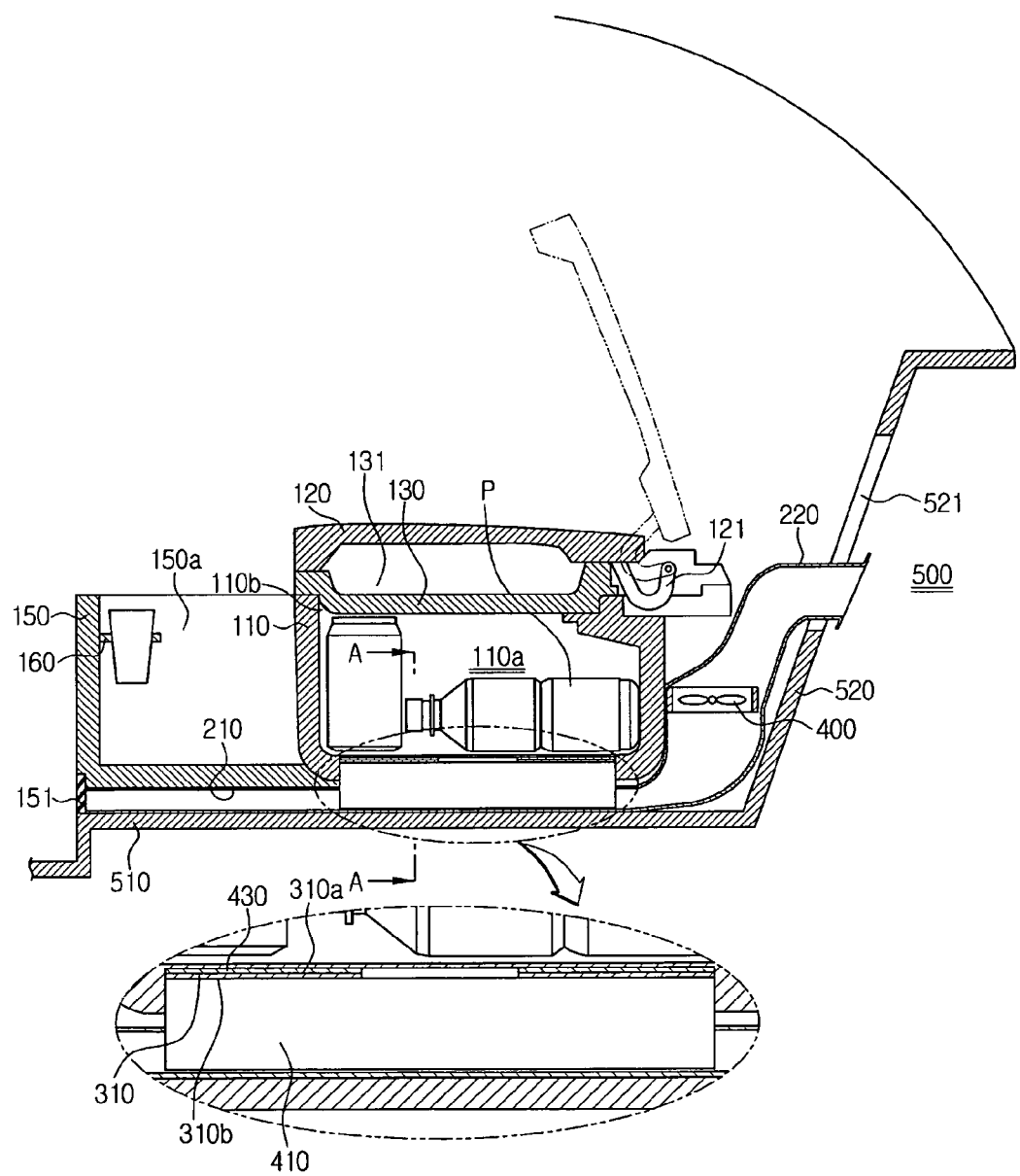
FIG. 2 is a sectional view showing the inside structure of the cooling and heating cabinet device in FIG. 1.
Figure 3:
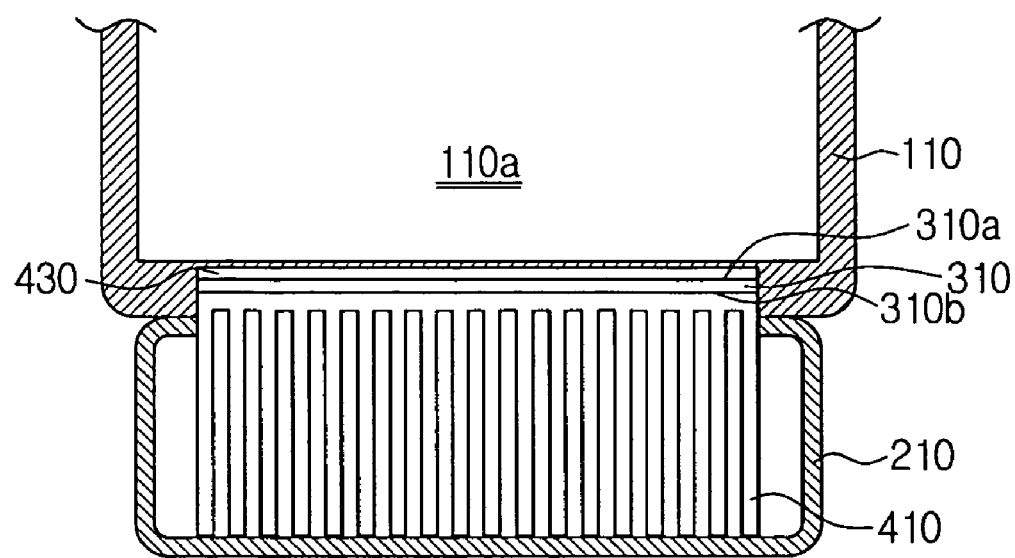
FIG. 3 is a sectional view showing a line A-A indicated in FIG. 2.

On the other hand, in the preferred embodiment of the present invention, as shown in FIGS. 1, 2 and 12, an article-keeping box 150 with an article-keeping space portion 150a formed therein is separately mounted on the front side of the cooling and heating cabinet 110, and the article-keeping space portion 150a has a cup holder 160 mounted therein, thereby providing a convenience to the passengers.

In this case, the introduction duct 210 is extended from the cooling and heating cabinet 110 to an absorption grill 151 formed on the front side of the article-keeping box 150 at the state of abutting with the lower surface of the article-keeping box 150. The indoor air is introduced through the absorption grill 151 to the introduction duct 210.

Further, in the first embodiment of the present invention, as shown in FIG. 12, the partition 520 of the vehicle body has a through-hole 522 for inserting the end portion side of the discharge duct 220 thereinto, such that the discharge duct 220 fluidically communicates with the trunk room 500.

Further, in the first embodiment of the present invention, as shown in FIG. 1, the end portion side of the discharge duct 220 is inserted into the lower side of a ski-mounting hole 521 that is previously formed on the partition 520 of the vehicle body, without having the separate through-hole 522 as mentioned above, and also, since the discharge duct 220 is inserted into the lower side of the ski-mounting hole 521, skies are inserted through the upper side of the ski-mounting hole 521 into the trunk room 500.

Up to now, the first embodiment of the present invention has been described.

Second Embodiment

Hereinafter, a second embodiment of the present invention will be described.

Figure 7:
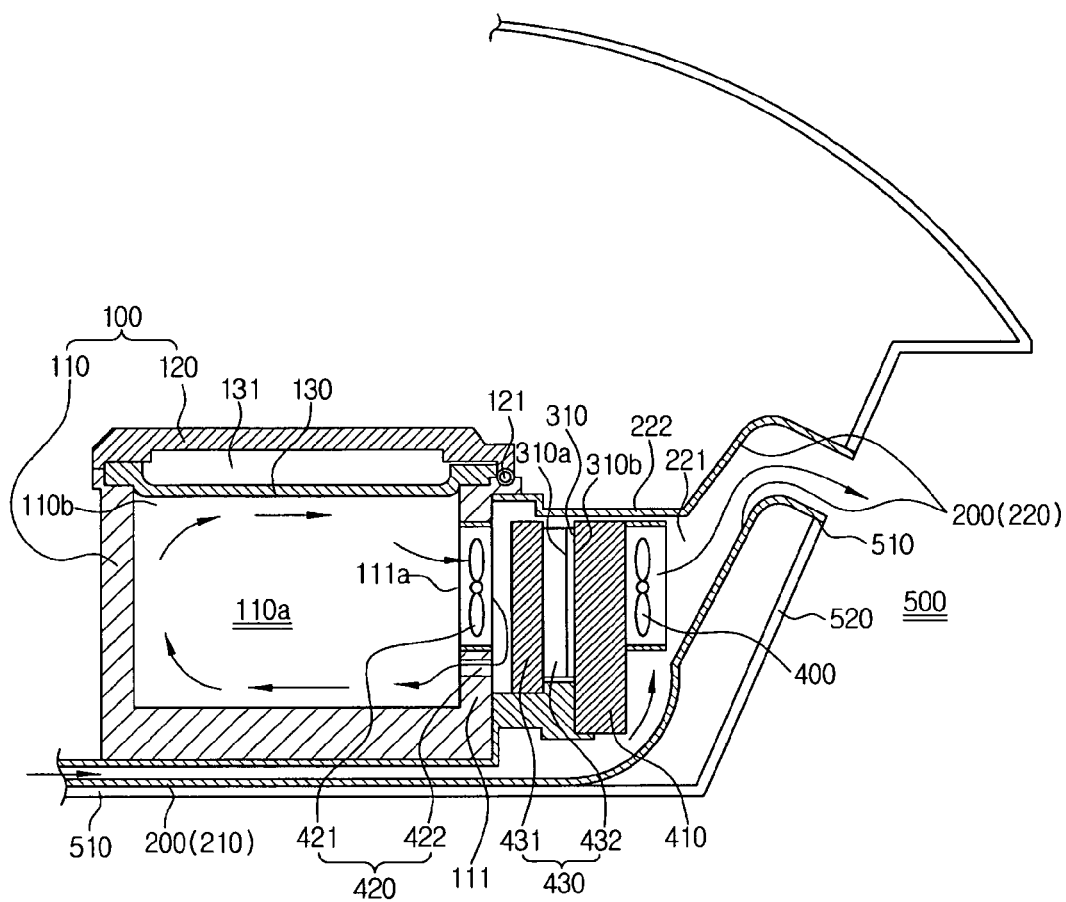
FIG. 7 is a sectional view showing the structure of a cooling and heating cabinet device according to a second embodiment of the present invention.
Figure 8:
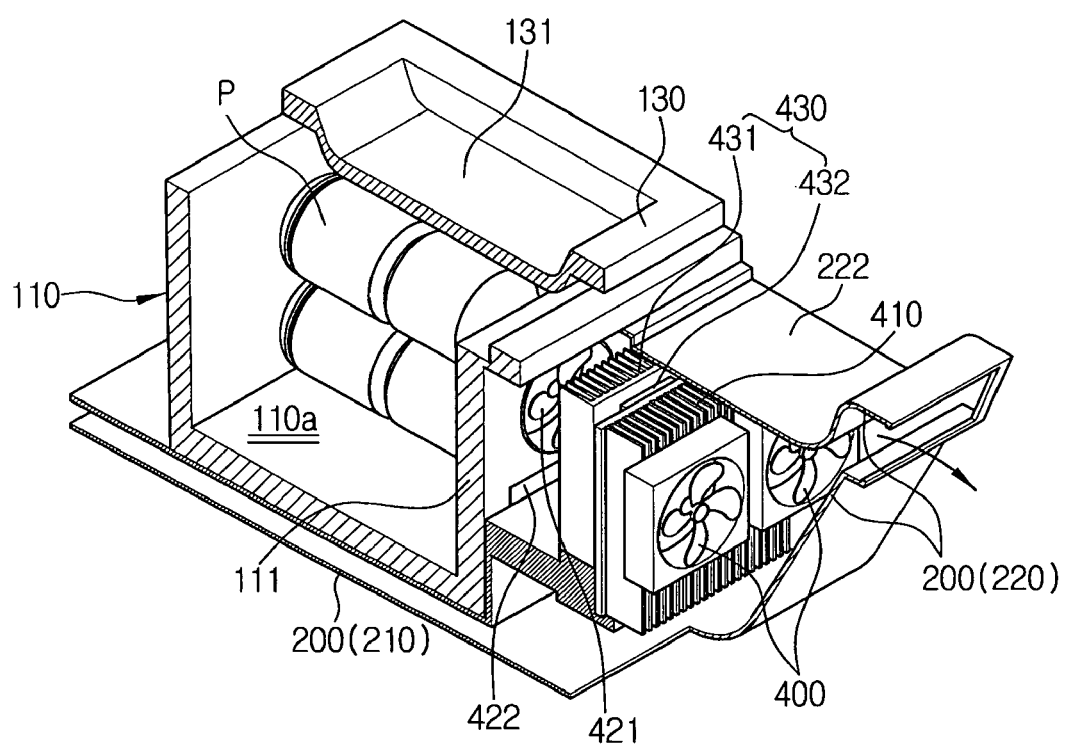
FIG. 8 is a perspective view showing the outer appearance of a partially cut-off cooling and heating cabinet device according to the second embodiment of the present invention.
Figure 9:
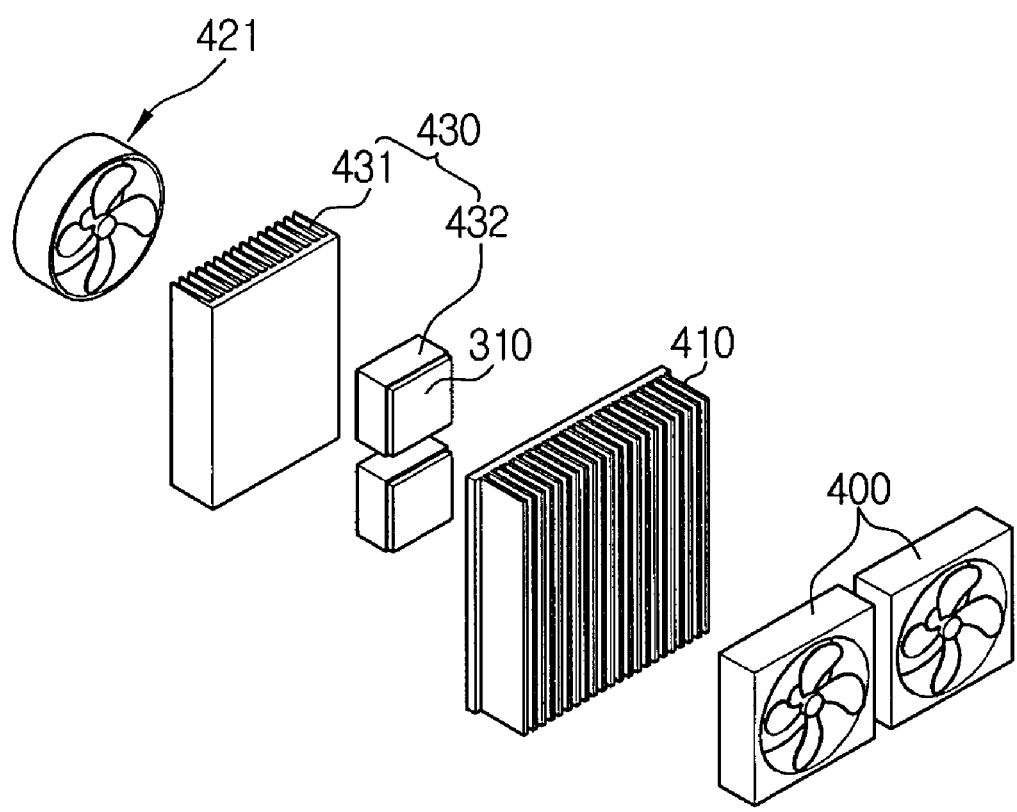
FIG. 9 is an exploded perspective view showing the arranging relation among a circulating fan, a heat-transmitting means, a thermoelectric module, a heat-exchange member, and an exhaust fan as parts of the cooling and heating cabinet device according to the second embodiment of the present invention.

An explanation of a cooling and heating cabinet device of a rear seat side for a vehicle using a thermoelectric module according to the second embodiment of the present invention will be given with reference to FIGS. 7 to 9.

The cooling and heating cabinet device according to the second embodiment of the present invention includes the cooling and heating cabinet 110, the cover 120, the duct 200, the thermoelectric module 310, and the exhaust fan 400.

The cooling and heating cabinet 110 is disposed at the upper surface of the middle portion of the floor panel 510 supporting the seat portions 51 of the rear seats 50 and has the storage room 110a opened at one side thereof.

Therefore, the rear seat 50 is disposed on the both sides of the cooling and heating cabinet 110. And, the cooling and heating cabinet 110 has such a size as to have the seat portion 51 of each rear seat 50 mounted positioned to the middle height thereof, such that the passengers after sitting on the seat portions 51 can place their arm on the cooling and heating cabinet 110.

In this case, the opened portion 110b of the storage room 110a is desirably opened toward the upper side of the cooling and heating cabinet 110.

The cover 120 serves to open and close the opened portion 110b of the cooling and heating cabinet 110 and also to place the passenger arm thereon, thereby providing the arm-resting function to him or her.

On the other hand, the keeping room-cover 130 is detachably mounted on the opened portion 110b, the keeping room-cover 130 having a keeping room 131 formed therein for containing articles that do not need to be cooled and heated therein.

That is to say, after the keeping room-cover 130 is mounted on the opened portion 110b if the cover 120 is closed, the keeping room 131 is formed by the indented space of the top surface of the cover 120 and by the indented space of the keeping room-cover 130.

As noted above, the cooling and heating cabinet 110 of the present invention has some advantages in having an arm-resting function, a cooling and heating function, and a function of keeping general articles therein.

In the case where the keeping room-cover 130 is provided, it is detachable from the opened portion 110b when articles are put or drawn in/from the storage room 110a.

On the other hand, the duct 200 includes the introduction duct 210 and the discharge duct 220. The introduction duct 210 is directed to the inside of the vehicle, and the discharge duct 220 fluidically communicates with a trunk room 500 through a partition 520 of a vehicle body that defines the interior of the vehicle and the trunk room 500 and supports the back portions 52 of the rear seats 50.

And, the introduction duct 210 is formed partially in such a manner as to come into contact with one side surface of the cooling and heating cabinet 110 except the top surface thereof, such that the indoor air flowing in through the introduction duct 210 is discharged through the discharge duct 220.

In the second embodiment of the present invention, the introduction duct 210 is positioned between the lower surface of the cooling and heating cabinet 110 and the floor panel 510, but may be positioned in such a manner as to come into contact with any one of the left and right sides of the cooling and heating cabinet 110.

According to the second embodiment of the present invention, unlike the structure of the discharge duct 220 in the first embodiment of the present invention, the cooling and heating cabinet device further includes an inner air-circulating passageway 111a formed passed through a rear side wall 111 of the cooling and heating cabinet 110, a discharge passageway 221 formed between the rear side wall 111 of the cooling and heating cabinet 110 and the discharge duct 220 facing the rear side wall 111, and a fluidical-fluidical-communicating duct 222 adapted to make the discharge passageway 221 fluidically communicate with the inner air-circulating passageway 111a, such that one side portion 310a of the thermoelectric module 310 faces the inner air-circulating passageway 111a, and the other side portion 310b thereof faces the discharge passageway 221, thereby defining the inside of the fluidical-communicating duct 222.

The thermoelectric module 310 is disposed below the cooling and heating cabinet 110 such that according to the direction of current flows, when one side portion 310a absorbs the heat generated in the storage room 110a, the other side portion 310b emits the heat to the duct 200, and when one side portion 310a emits heat to the storage room 110a, the other side portion 310b absorbs the heat generated in the duct 200.

The other side portion 310b of each of the thermoelectric modules 310 is disposed on the heat-exchange member 410 so as to heat-exchange with the indoor air flowing in through the duct 200.

On the other hand, unlike the first embodiment of the present invention, the second embodiment of the present invention further includes an inner air-circulating means 420 for forcedly circulating in the storage room 110a the cooled or heated air by means of heat absorbing or heat emitting at one side portion 310a of the thermoelectric module 310.

The inner air-circulating means 420 has a circulating fan 421 rotatably mounted in the inner air-circulating passageway 111a and a return passageway 422 adapted to fluidically communicate with the inner air-circulating passageway 111a and with the storage room 110a, and referring to their operations, after the air in the storage room 110a flows in through the circulating fan 421, the air is heat-exchanged with one side portion 310a of the thermoelectric module 310 and returns to the storage room 110a through the return passageway 422.

In this case, the circulating fan 422 is desirably formed of a centrifugal fan.

Further, in the second embodiment of the present invention, the heat-transmitting means 430 is additionally disposed at one side portion 310a of the thermoelectric module 310, for conducting the cooperative heat transmission between the air flowing in through the circulating fan 321 and one side portion 310a of the thermoelectric module 310.

In this case, the heat-transmitting means 430 has a heat-transmitting block 432 disposed at one side portion 310a of the thermoelectric module 310 and a pin-shaped heat-transmitting member 431 disposed between the circulating fan 421 and the heat-transmitting block 432 in such a manner as to abut with the heat-transmitting block 432.

The exhaust fan 400 is disposed in the duct 200, for discharging the indoor air flowing in the introduction duct 210 to the discharge duct 220, and it is desirably disposed on the outer surface of the heat-exchange member 410.

In the second embodiment of the present invention, the exhaust fan 400 is formed of an axial fan.

On the other hand, in the second embodiment of the present invention, the storage room 110a, the introduction duct 210, and the discharge duct 220 are arranged in the lengthwise direction of the cooling and heating cabinet 110, thereby allowing the cooling and heating cabinet 110 of the present invention to be compact in the size.

In the same manner as the first embodiment of the present invention, moreover, the introduction duct 210 in the second embodiment of the present invention is, as shown in FIGS. 1 and 12, extended up to the end portion of the floor panel 510 on which the rear seat 50 is disposed, thereby effectively absorbing the air ventilated at the rear-floor side. That is to say, the introduction duct 210 is disposed on the top portion of the protruded portion 511 of the floor panel 510 formed between the passengers sitting the left and right rear seats, thereby absorbing the indoor air that is relatively less polluted.

On the other hand, in the preferred embodiment of the present invention, as shown in FIGS. 1, 2 and 12, the article-keeping box 150 with the article-keeping space portion 150*a* formed therein is separately mounted on the front side of the cooling and heating cabinet 110, and the article-keeping space portion 150*a* has the cup holder 160 mounted therein, thereby providing a convenience to the passengers.

In this case, the introduction duct 210 is extended from the cooling and heating cabinet 110 to the absorption grill 151 formed on the front side of the article-keeping box 150 at the state of abutting with the lower surface of the article-keeping box 150. The indoor air is introduced through the absorption grill 151 to the introduction duct 210.

In the same manner as the first embodiment of the present invention, further, in the second embodiment of the present invention, as shown in FIG. 12, the partition 520 of the vehicle body has the through-hole 522 for inserting the end portion side of the discharge duct 220 thereinto, such that the discharge duct 220 fluidically communicates with the trunk room 500.

Further, in the same manner as the first embodiment of the present invention, as shown in FIG. 1, the end portion side of the discharge duct 220 in the second embodiment of the present invention is inserted into the lower side of the ski-mounting hole 521 that is previously formed on the partition 520 of the vehicle body, without having the separate through-hole 522 as mentioned above, and also, since the discharge duct 220 is inserted into the lower side of the ski-mounting hole 521, skies are inserted through the upper side of the ski-mounting hole 521 into the trunk room 500.

Figure 11:
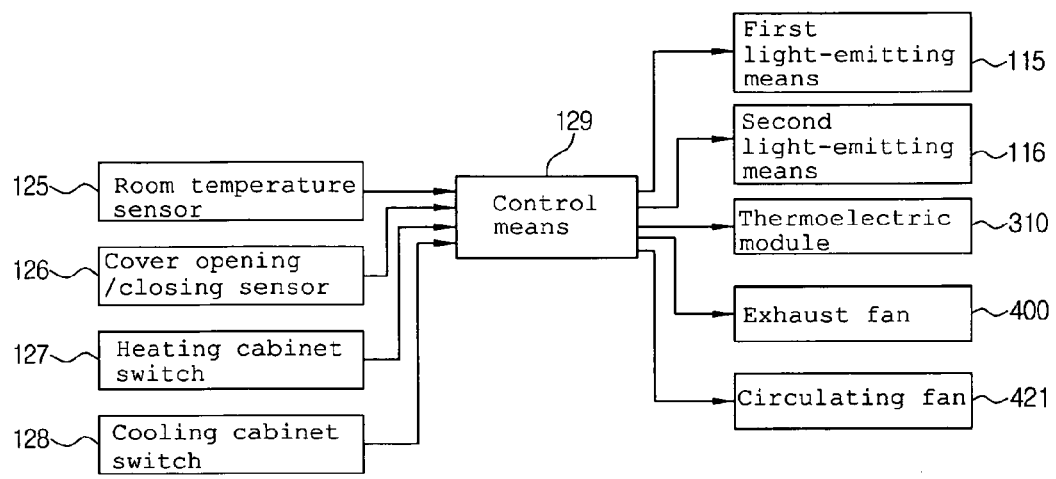
FIG. 11 is a block diagram showing the control of the cooling and heating cabinet device according to the first and second embodiments of the present invention.

In addition to the configurations of the first and second embodiments of the present invention, on the other hand, the storage room 110*a* has a room temperature sensor 125 mounted therein as shown in FIG. 11, and if the storage room 110*a* serves as a cooling device, the temperature of the storage room 110*a* falls to 0° C., thereby preventing the icing in the storage room 110*a*.

That is to say, if the temperature of the storage room 110*a* sensed by the room temperature sensor 125 falls to 0° C., the thermoelectric module 310 is controlled by means of a control means 129 so as to keep the temperature of the storage room 110*a* at 0° C.

And, in the case where the storage room 110*a* serves as a heating device, if the temperature of the storage room 110*a* sensed by the room temperature sensor 125 is over 50° C., the thermoelectric module 310 is controlled by means of the control means 129 so as to prevent a user from being burnt, such that the temperature of the storage room 110*a* is kept at 50° C.

On the other hand, as shown in FIG. 11, a cover opening/closing sensor 126 is provided for sensing whether the cover 120 is opened or closed, and for example, it is formed of a limit switch.

When opening the cover 120 is sensed by the cover opening/closing sensor 126 by the control of the control means 129, the articles are put or drawn in/from the storage room 110*a*, and in this case, the circulating fan 421 stops by the control of the control means 129 for preventing the consumption of power.

As shown in FIG. 11, the present invention further includes first and second light-emitting means 115 and 116 emitting different lights that are disposed in the cooling and heating cabinet 110 for checking out the articles in the night during which the inside of the vehicle gets dark, and for example, the first and second light-emitting means 115 and 116 are formed of light-emitting diodes.

If the storage room 110*a* serves as the cooling device, the first and second light-emitting means 115 and 116 have blue colors, and contrarily, if serves as the heating device, they have red colors.

And, in the first and second embodiments of the present invention, if the power applied to the thermoelectric module 310 is turned off, that is, if the cooling and heating cabinet is not used as the cooling or heating device, the exhaust fan 400 is activated to discharge the polluted indoor air to the trunk room 500, thereby having the indoor air-refreshing function.

In this case, the control means 129 may be the controller of the air conditioning system as mentioned above, or may be a separate controller.

On the other hand, in the preferred embodiment of the present invention, as shown in FIGS. 1, 2 and 11, the article-keeping box 150 with the article-keeping space portion 150*a* formed therein is separately mounted at the front side of the cooling and heating cabinet 110, and the article-keeping space portion 150*a* has the cup holder 160 mounted therein, thereby providing a convenience to the passengers.

INDUSTRIAL APPLICABILITY

As mentioned above, a cooling and heating cabinet device of a rear seat side for a vehicle using a thermoelectric module according to the preferred embodiments of the present invention has the following advantages:

First, according to the present invention, the cooling and heating cabinet device is mounted between the rear seats of a vehicle, having cooling and heating function and further having an arm-resting function irrespective of its activation as the cooling and heating device.

Secondly, the introduction duct constituting the duct is positioned between the lower surface of the cooling and heating cabinet and the floor panel, which makes the outer appearance more compacted when compared with that formed on left or right side of the cooling and heating cabinet.

Thirdly, the heat-exchange member is separately disposed for heat-exchanging with the air in the duct, thereby improving the heat-exchanging performance, which allows the performances the thermoelectric module has to be utilized to the maximum and improves the cooling or heating function of the storage room of the cooling and heating cabinet.

Fourthly, the cooled or heated air in the storage room of the cooling and heating cabinet is forcedly circulated, thereby allowing its temperature to be evenly distributed at the inside of the vehicle.

Fifthly, the storage room, the introduction duct, and the discharge duct are arranged in the lengthwise direction of the cooling and heating cabinet, thereby allowing the cooling and heating cabinet of the present invention to be compact in the size.

Sixthly, the introduction duct is extended to the end portion of the floor panel on which the rear seat is disposed, thereby effectively absorbing the air ventilated at the rear-floor side and also absorbing the indoor air that is relatively less polluted.

Seventhly, the end portion side of the discharge duct is inserted into the lower side of the ski-mounting hole that is previously formed on the partition of the vehicle body, without having the separate through-hole as mentioned above, and also, since the discharge duct is inserted into the lower side of the ski-mounting hole, skies are inserted through the upper side of the ski-mounting hole into the trunk room.

Eighthly, even when power is not applied to the thermoelectric module of the cooling and heating cabinet, when the indoor air should be ventilated, the exhaust fan is activated such that the indoor air is absorbed through the introduction duct and is discharged through the discharge duct to the trunk room side. At this time, the exhaust fan is controlled by means of a controller of an air conditioning system basically provided in the vehicle.

Finally, even when the thermoelectric module is operated, the exhaust fan is activated by the control of the controller of the air conditioning system, thereby achieving the air-refreshing function as well as the cooling or heating mode function of the cooling and heating cabinet.

The invention claimed is:

1. A cooling and heating cabinet device of a rear seat side for a vehicle using a thermoelectric module, the cooling and heating cabinet device comprising:
 a cooling and heating cabinet disposed at the upper surface of the middle portion of a floor panel supporting seat portions of rear seats of the vehicle and having a storage room opened at one side thereof;
 a cover for opening and closing an opened portion of the cooling and heating cabinet;
 a duct having an introduction duct and a discharge duct, the introduction duct being directed to the inside of the vehicle and the discharge duct fluidically communicating with a trunk room through a partition of a vehicle body defining the interior of the vehicle and the trunk room in such a manner as to discharge the indoor air flowing in through the introduction duct therethrough, the introduction duct and the discharge duct of the duct having one side of the cooling and heating cabinet contacted therebetween;
 the thermoelectric module disposed below the cooling and heating cabinet such that according to the direction of current flows, when one side portion thereof absorbs the heat generated in the storage room, the other side portion thereof emits the heat to the duct, and when one side portion emits heat to the storage room, the other side portion absorbs the heat generated in the duct; and
 an exhaust fan disposed in the duct for introducing the indoor air through the introduction duct and for discharging the absorbed air to the discharge duct.

2. The cooling and heating cabinet device according to claim 1, wherein the introduction duct is positioned between the lower surface of the cooling and heating cabinet and the floor panel.

3. The cooling and heating cabinet device according to claim 2, wherein the thermoelectric module is mounted between the cooling and heating cabinet and the duct such that one side portion of the thermoelectric modules contacts with the lower surface of the cooling and heating cabinet and the other side portion thereof contacts with the upper surface of the duct, and the other side portion of the thermoelectric module is disposed on a heat-exchange member so as to heat-exchange with the indoor air flowing in through the duct.

4. The cooling and heating cabinet device according to claim 3, wherein a heat-transmitting means is further disposed between one side portion of the thermoelectric module and the lower surface of the cooling and heating cabinet.

5. The cooling and heating cabinet device according to claim 1, further comprising:
 an inner air-circulating passageway formed passed through a rear side wall of the cooling and heating cabinet;
 a discharge passageway formed between the rear side wall of the cooling and heating cabinet and the discharge duct facing the rear side wall; and
 a fluidical-communicating duct adapted to make the discharge passageway fluidically communicate with the inner air-circulating passageway,
 wherein one side portion of the thermoelectric module faces the inner air-circulating passageway, and the other side portion thereof faces the discharge passageway, thereby defining the inside of the fluidical-communicating duct.

6. The cooling and heating cabinet device according to claim 5, wherein the other side portion of the thermoelectric modules is disposed on a heat-exchange member so as to heat-exchange with the indoor air flowing in through the duct.

7. The cooling and heating cabinet device according to claim 5, wherein an inner air-circulating means is adapted to forcedly circulate in the storage room the cooled or heated air by means of heat absorbing or heat emitting at one side portion of the thermoelectric module.

8. The cooling and heating cabinet device according to claim 7, wherein the inner air-circulating means comprises:
 a circulating fan rotatably mounted in the inner air-circulating passageway; and
 a return passageway adapted to fluidically communicate with the inner air-circulating passageway and with the storage room,
 wherein after the air in the storage room flows in through the circulating fan, the air is heat-exchanged with one side portion of the thermoelectric module and returns to the storage room through the return passageway.

9. The cooling and heating cabinet device according to claim 8, wherein a heat-transmitting means is further disposed at one side portion of the thermoelectric module, for conducting the cooperative heat transmission between the air flowing in through the circulating fan and one side portion of the thermoelectric module.

10. The cooling and heating cabinet device according to claim 1, wherein the opened portion of the cooling and heating cabinet is opened upwardly and has a keeping room-cover is detachably mounted thereon, the keeping room-cover having a keeping room formed at the inside thereof for containing articles therein.

11. The cooling and heating cabinet device according to claim 1, wherein the storage room, the introduction duct, and the discharge duct are arranged in the lengthwise direction of the cooling and heating cabinet.

12. The cooling and heating cabinet device according to claim 1, wherein the introduction duct is extended up to the end portion of the floor panel disposing the rear seat thereon.

13. The cooling and heating cabinet device according to claim 1, wherein the partition of the vehicle body has a through-hole for inserting the end portion side of the discharge duct thereinto.

14. The cooling and heating cabinet device according to claim 1, wherein the end portion side of the discharge duct is inserted into the lower side of a ski-mounting hole that is previously formed on the partition of the vehicle body.

15. The cooling and heating cabinet device according to claim 1, wherein even when power is not applied to the thermoelectric module of the cooling and heating cabinet, when the indoor air should be ventilated, the exhaust fan is activated such that the indoor air is introducing through the introduction duct and is discharged through the discharge duct to the trunk room side.

* * * * *